P. A. FAUST.
CAR FENDER.
APPLICATION FILED FEB. 5, 1909.

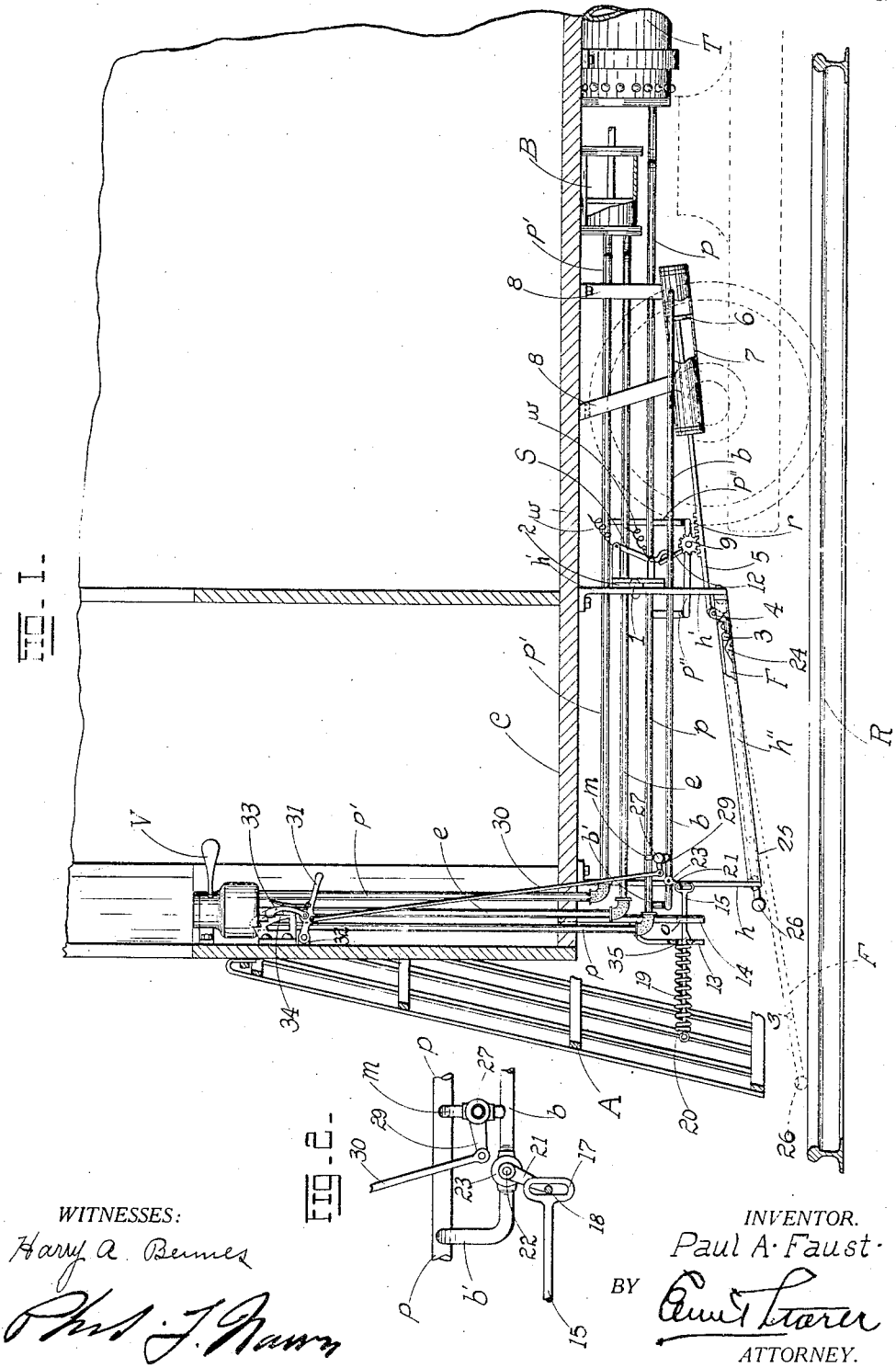

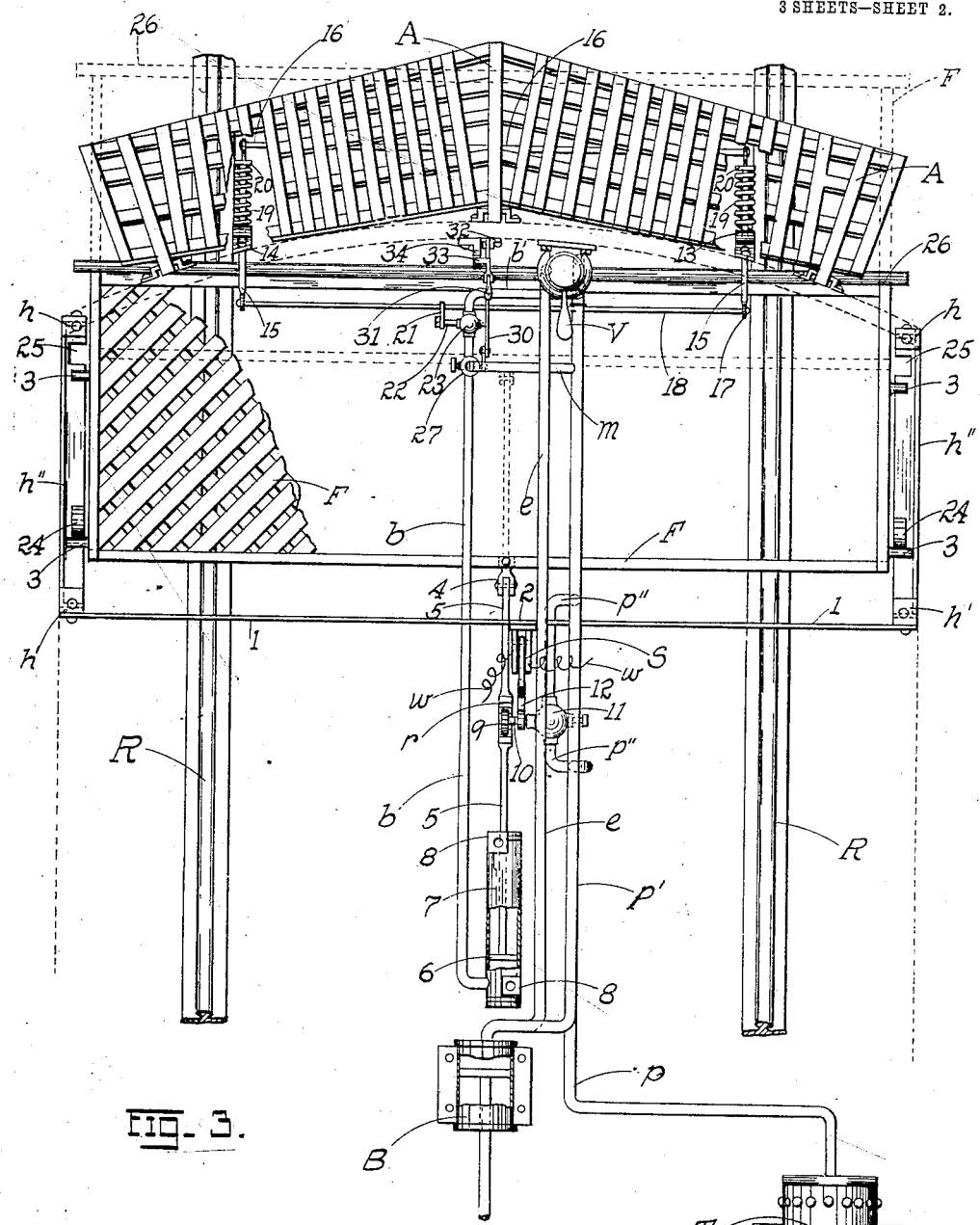

930,062.

Patented Aug. 3, 1909.
3 SHEETS—SHEET 3.

WITNESSES:
Harry A. Beimes
Phil J. Nawn

INVENTOR.
Paul A. Faust.
BY
Emil Starek
ATTORNEY.

UNITED STATES PATENT OFFICE.

PAUL A. FAUST, OF ST. LOUIS, MISSOURI.

CAR-FENDER.

No. 930,062.      Specification of Letters Patent.      Patented Aug. 3, 1909.

Application filed February 5, 1909. Serial No. 476,297.

*To all whom it may concern:*

Be it known that I, PAUL A. FAUST, citizen of the United States, residing at St. Louis, State of Missouri, have invented certain new and useful Improvements in Car-Fenders, of which the following is a full, clear, and exact description, reference being had to the accompanying drawings, forming a part hereof.

My invention has relation to improvements in car-fenders; and it consists in the novel construction of fender more fully set forth in the specification and pointed out in the claims.

Figure 4:
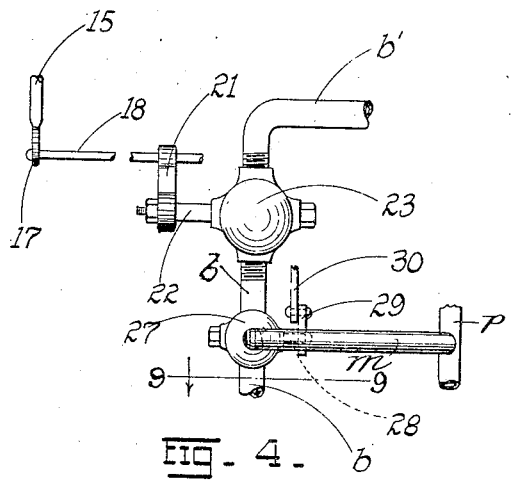
Figure 5:
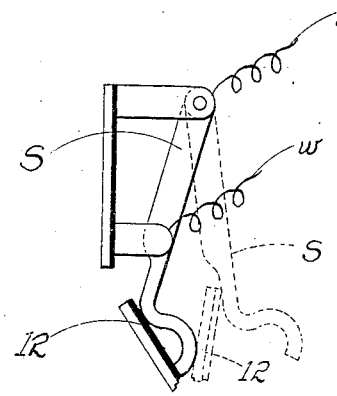
Figure 6:
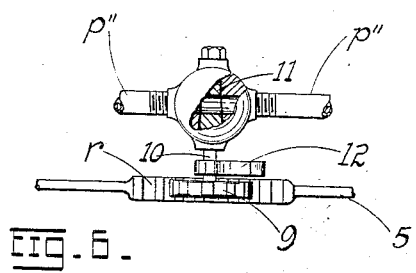
Figure 8:
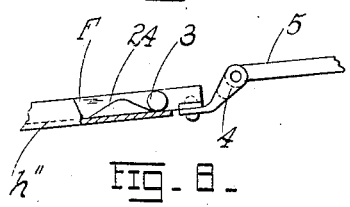
Figure 7:
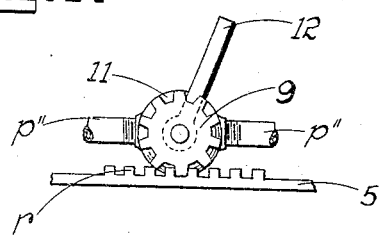
Figure 9:
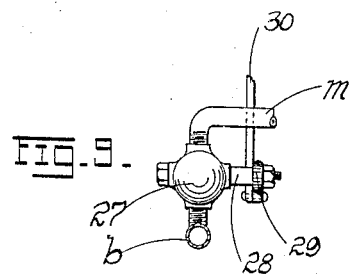
Figure 10:
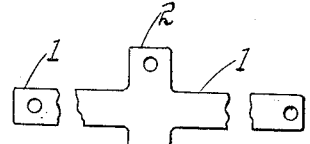
Figure 11:
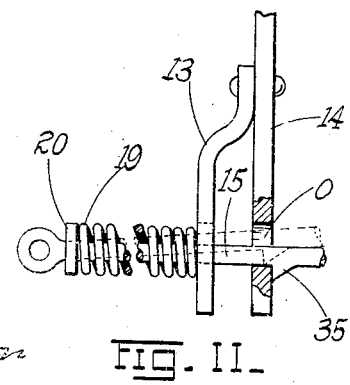

In the drawings, Figure 1 is a vertical middle section of the front of a street car showing my invention in side elevation, with parts broken away; Fig. 2 is an enlarged elevational view of the piping showing the position of the valves for controlling the admission of the compressed air for normal and emergency operations; Fig. 3 is a top plan of the device with car body shown in dotted outline; Fig. 4 is a top plan of the valves shown in Fig. 2; Fig. 5 is a side view of the knife-switch controlling the current operating the motor; Fig. 6 is a top plan of the air valve which controls the air to the brake-cylinder in the event of collision and of the rack and pinion by which same is operated; Fig. 7 is a side elevation of Fig. 6; Fig. 8 is a side elevational detail (parts broken away) of the rear lower end of the hanger which supports the drop fender, a portion of the latter being also shown; Fig. 9 is a section on the line 9—9 of Fig. 4; Fig. 10 is an elevation of the cross-bar which supports the knife-switch or circuit breaker; and Fig. 11 is an end elevational detail of the spring buffer which releases the air to the fender cylinder and brake cylinder upon impact with an object or person on the track.

The object of my invention is to construct a car-fender which shall be automatically projected against the rails in case a person on the track is struck by the car, the power utilized for this purpose being the compressed air now generally carried on the car for purposes of operating the brakes.

A further object is to provide means for automatically breaking the circuit of the electric motor by which the car is propelled, and likewise release the air from the air tank to set the brakes.

A further object is to provide mechanism which in cases of emergency, and before the impact of the car with the person can take place, may be operated by the motorman, thereby actuating the fender, cutting off the current and applying the brakes, the same as if the impact took place.

A further object is to provide means which in the event of impact or collision, will insure a positive release of the compressed air to accomplish the ends sought, and at the same time cut off the current operating the motor.

The advantages of the invention will be best apparent from a detailed description thereof which is as follows:—

Referring to the drawings, C, represents a section of a passenger car, and A, the ordinary apron or stationary fender with which the fronts of street cars are usually provided.

R, represents the rails over which the car runs. Located on one side at the bottom of the car, as usual, is the compressed air tank T, from which leads forward the compressed air supply pipe $p$ terminating at the air-control valve V whence it leads rearward as pipe $p'$ into the adjacent end of the brake-cylinder B. From the same end of the brake-cylinder leads forward and upward the exhaust pipe $e$, the same terminating at the control-valve V.

All the parts thus far referred to are well known, forming the equipment of the majority of electric cars today, and constitute no part of my invention. They are however referred to, since my improvement depends for its operation on the compressed air released from the tank T.

Depending from the car floor on each side of the front of the car is a U-shaped hanger composed of the vertical arms $h$, $h'$ and a forwardly and downwardly inclined connecting angle-bar member $h''$, the rear pair of arms $h'$ of the respective hangers being connected by a cross-bar 1 provided with central wings 2, 2 for the support of an ordinary knife-edge switch or circuit breaker S. The knife-switch is herein shown conventionally as it forms *per se* no part of my invention. Leading from the switch are conducting wires $w$, $w$ forming a part of the circuit identified with the motor (not shown) by which the car is propelled. Supported by the angle members $h''$ of the hangers is the outer frame of a movable or drop fender F, the body of which is preferably composed of cross-slats as shown (Fig.

3), the support of said fender being effected by the studs 3, 3, projecting from the sides of the fender frame and resting on the horizontal legs or webs of the angle member $h''$ referred to. At the center of the rear of the drop fender frame is a forked bracket 4 to which is coupled the adjacent end of a link 5 which constitutes the piston rod of the piston 6 of the fender cylinder 7, the latter being secured in an inclined position below the floor of the car by means of straps or brackets 8. At a convenient point along the length of the piston rod 5 is formed a rack $r$ with the teeth of which mesh the teeth of a pinion 9 at the adjacent end of the stem 10 of a rotatable cock or valve 11, the stem 10 having also secured thereto, an insulated arm 12 which engages with the switch arm of the switch S (Figs. 1, 3, 5). The valve 11 is interposed in the path of a bent pipe $p''$ which connects the pipes $p$, $p'$, so that when the valve 11 is rotated to open position (Fig. 6), the compressed air may pass from the air tank T through the pipe $p$, into pipe $p''$ thence into pipe $p'$ and into the brake cylinder B with the usual results of applying the brakes. In Fig. 1 this valve 11 is shown closed, the arm 12 inclining forwardly, but as the valve is being turned to the right to open position, the arm 12 engaging as it does the switch arm S, will throw the switch arm out of engagement with its contact arms (Fig. 5) thus breaking the circuit and cutting off the power to the motor (not shown). This action of the valve 11 is referred to at this point to facilitate understanding of the operation of the fender when finally reviewed.

Depending from the front end of the car platform on each side of the center of the car are pairs of bracket arms 13, 14 through which freely pass and operate the buffer rods 15, the front ends thereof being connected by a cross rod 16, and their rear ends terminating in vertically slotted loops 17 through which freely pass the ends of a rear parallel cross rod 18, the parts 15, 16, 18, thus collectively forming a buffer which is normally projected toward the apron A by the expanding springs 19, encircling the rods 15 and confined between the brackets 13 and outer terminal collars 20 on the rods (Fig. 11). Loosely looped about the rear member 18 of the buffer is the crank-arm 21, carried at the end of the stem 22 of a rotary or rock-valve 23, which valve is interposed in the pipe $b$ leading from the fender cylinder 7 at a point behind the piston 6 thereof. The forward end of the pipe $b$ terminates in an elbow $b'$ which connects with the pipe $p$ leading from the compressed air tank T. It will thus be seen that with the rocking of the valve 23 to open position the compressed air will pass from the pipe $p$ through elbow $b'$, valve 23, pipe $b$ into the fender cylinder 7 behind the piston 6 and drive the latter forward.

When the fender frame F rests on the hangers $h$, $h'$, $h''$, the rear studs 3 thereof rest behind the wedge-shaped ridges 24 formed on the horizontal legs of the angle members $h''$ (Figs. 3, 8) the forward pair of studs 3 occupying a position just behind the front recesses 25 formed in the horizontal legs of said angle bars $h''$. The front bar or member 26 of the drop fender frame may be covered with soft material, such as leather if desirable.

Connecting the pipes $p$ and $b$ immediately to the rear of the valve 23 is a bent pipe $m$ in the vertical leg of which is mounted a rockvalve 27 to the stem 28 of which is secured an arm 29 to which is pivotally coupled the lower end of a link 30. The upper end of the link is pivotally coupled at an intermediate point to a vertically oscillating emergency lever 31 pivoted at one end to a bracket 32 in the front of the car, the lever carrying a spring controlled pawl 33 of well known construction operating in conjunction with a ratchet 34, likewise secured to the car front. Normally, the valve 27 is closed; but when the lever 31 is raised sufficiently to rock the valve to open position by drawing on the link 30, the valve opens with the result that it allows the compressed air to flow past it from the pipe $p$ through pipe $m$ and pipe $b$ into the fender cylinder 7.

The side buffer members 15 are provided with bevel projections or teeth 35 (Fig. 11) along their bottom edges which act as pawls, the tooth, after it has been forced or pushed through the opening $o$ of the bracket arm 14 locking the member 15 by dropping behind the lower edge of the opening (Fig. 11) and thereby locking the entire buffer-frame against a return to its original position after an impact. The advantage of this feature will be better apparent from a description of the operation of the fender which is as follows:—Assume the parts to be normally as shown in Figs. 1 and 2, and suppose the car strikes a person who happens to be standing on the track. The impact with the person (or object) struck will cause the apron A yielding under the impact to compress the springs 19, thereby forcing the buffer frame inwardly. With this inward movement the pawls 35 will be forced from their normal position behind the brackets 13 to a locked position behind the lower edges of the openings $o$ in the brackets 14 (Fig. 11) thus preventing a return of the buffer frame (for the time being) back to its original position. With this inward movement of the buffer frame (comprising the parts 15, 16, 18) the loops 17 engaging as they do the member 18, the crank arm 21 will be rocked in proper direction to open the valve 23, thereby allowing compressed air to flow from the tank T through pipes $p$, $b'$ $b$ into the fender cylinder 7 behind the piston 6 thereof. The air will drive the piston 6 forward, and this in turn through the piston rod connection 5 will force the drop fender F forward; but in this forward movement the front supporting studs 3, 3 of said fender will come opposite the recesses 25 of the hangers thus allowing the fender to drop on to the rails R (dotted position Fig. 1). Thus the person or object struck can not come under the wheels of the truck. In this forward movement of the piston rod 5, the rack r thereof rotates the pinion 9 which in turn rocks the valve 11 in proper direction not only for opening the valve, but to oscillate the arm 12 carried by the stem 10 thereof in proper direction to first disengage the switch-arm S and thus cut off the electric power which drives the motor (not shown). The disengagement or throwing open of the switch S takes place before the valve 11 is fully open (and practically before it opens at all) in order that the power may be cut off before compressed air can pass through the valve. When the valve 11 is fully open, compressed air flows from the pipe p, through pipe p″ into pipe p′ into the brake cylinder and applies the brakes (not shown) in the usual way. It follows therefore that when a person or object on the track is struck, the drop fender is projected forward by the compressed air released from the pipe p, and at the same time the electric circuit is broken to cut off the power to the motor, and the air is likewise released to apply the brakes. The locking of the buffer by the pawls 35 in the manner indicated is to prevent a return of the buffer to its normal position in which return it would rock the valve 23 to closed position before the air had a chance to project or force the drop fender outwardly. The valve 23 is thus kept open to permit the air to accomplish the object of forcing out the drop fender. After the accident the buffer may readily be restored to its original position by disengaging the pawls 35 from the brackets 14 and allowing the springs 19 to once more expand. The drop fender when restored or raised back on to its hangers is locked in position by the rear studs 3 dropping behind the gradually sloping faces of the ridges 24 over which however they easily ride with the forward projection of the fender F. Should the motorman be in position to avoid an impact, in case he sees the person on the track in time, he simply raises the lever 31 which through the medium of the link 30 rocks the valve 27 to open position, thereby releasing the air from the pipe p into the pipe m and thence into pipe b and fender cylinder 7 the same as in case of actual collision. The drop fender will be forced outwardly, the current cut off, and the brakes applied just as before. This emergency lever 31 should of course be resorted to wherever possible to avoid collision. In the raising of the lever 31 the pawl 33 rides over the ratchet 34, and thus prevents accidental return of the lever to its normal position if released.

Having described my invention, what I claim is:—

1. In combination with a compressed air tank mounted on a car, a movable fender, and devices for releasing the air from the tank and applying the same to project the fender forwardly from its normal position of rest on the car.

2. In combination with a compressed air tank mounted on a car, a movable fender, and devices for automatically releasing the air from the tank upon impact of the car with an object on the track, and applying the same to project the fender forwardly from its position of rest on the car.

3. In combination with a compressed air tank and brake cylinder mounted on a car, a movable fender, and devices for releasing the air from the tank to the brake cylinder and simultaneously applying a portion of the air to project the fender forwardly from its position of rest on the car.

4. In combination with a compressed air tank, brake cylinder and an electric-motor circuit on the car, a movable fender, and devices for releasing the air from the tank to the brake cylinder, and applying a portion of the air to break the circuit and project the fender forwardly from its position of rest on the car.

5. In combination with a compressed air tank and brake cylinder mounted on a car, a movable fender, and devices for automatically releasing the air from the tank to the brake cylinder upon impact of the car with an object on the track, and applying a portion of the air to project the fender forwardly from its position of rest on the car.

6. In combination with a compressed air tank, a brake cylinder and an electric-motor circuit on the car, a movable fender and devices for automatically releasing the air from the tank to the brake cylinder upon impact of the car with an object on the track, and applying a portion thereof to break the circuit and project the fender forwardly from its position of rest on the car.

7. In combination with a compressed air tank mounted on a car, a yielding buffer, a movable drop fender at the front end of the car, a fender cylinder and piston therefor, intermediate connections between the fender and piston, pipe connections between the air tank and fender cylinder, and suitable valves controlled by the buffer upon impact thereof with an object on the track to release the air from the tank into the fender cylinder and project the drop fender forwardly.

8. In combination with a compressed air tank and brake cylinder mounted on a car, a yielding buffer, a movable drop fender on the car, a fender cylinder and piston therefor, intermediate connections between the fender and piston, pipe connections between the air tank and fender cylinder and between said tank and the brake cylinder, suitable valves controlled by the buffer upon impact thereof with an object on the track to release the air from the tank to the fender cylinder and actuate the fender, and valves actuated by the intermediate connections between the fender cylinder and drop fender for releasing the air to the brake cylinder.

9. In combination with a compressed air tank, brake cylinder and electric-motor circuit on a car, a yielding buffer, a movable drop fender on the car, a fender cylinder and piston therefor, intermediate connections between the fender and piston, pipe connections between the air tank and fender cylinder and between the air tank and brake cylinder, suitable valves controlled by the buffer upon impact thereof with an object on the track to release the air from the tank to the fender cylinder and forwardly project the fender and actuate the valves responding to the movement of the fender for breaking the circuit and releasing the air from the tank to the brake cylinder.

10. In combination with a drop fender mounted on a car, a compressed air cylinder and piston therefor, a piston-rod connecting the piston to the fender, a brake cylinder, pipes connecting the brake cylinder with a suitable air tank, a rack on the piston rod, a rock-valve positioned to control the passage of the air from the air tank to the brake-cylinder, a pinion coupled to the valve and meshing with the rack aforesaid the latter actuating the pinion with any movement of the piston and adapted to rotate the valve to open position to release the air to the brake cylinder upon movement of the fender in proper direction.

11. In combination with a drop fender mounted on a car, a compressed air cylinder and piston therefor, a piston rod connecting the piston to the fender, a brake cylinder, an air tank, pipes connecting the tank with the brake cylinder, an electric-motor circuit and switch therefor on the car, a rack on the piston rod, a rock-valve positioned to control the passage of the air from the tank to the brake cylinder, a pinion coupled to the valve and meshing with the rack aforesaid, a member secured to the valve stem and engaging the switch arm, the rack actuating the pinion and switch engaging member with a movement of the piston and adapted to rotate the valve to open position to release the air to the brake cylinder, and to throw the switch in time to cut off the current, upon a movement of the piston and fender in proper direction.

12. In combination with a compressed air tank on a car, a drop fender movable in a direction lengthwise of the car, a fender cylinder having pipe connections leading to the air tank, means for actuating the fender from the fender cylinder, an emergency member, a valve positioned to control the release of the air from the air tank to the fender cylinder, and intermediate connections between the emergency member and valve for opening the latter upon movement of the member in proper direction.

13. In combination with a car, hangers on opposite sides thereof provided with bottom members having recesses at their front portions, a drop fender provided with studs resting on the bottom members and adapted to drop through the recesses with a forward movement of the fender whereby the front of the fender is allowed to drop on to the rails and devices on the bottom members for engaging the studs for an elevated position of the fender.

14. In combination with a car, a spring-controlled yielding buffer, means on the car for locking the buffer after impact thereof with an object on the track and preventing the same from resuming its normal position, a fender, and pneumatically controlled devices for actuating the fender with the impact aforesaid.

15. In combination with a car, a buffer, a drop fender movable longitudinally of the car, and pneumatically controlled mechanism for forwardly projecting and dropping the fender upon impact of the buffer with an object on the track.

In testimony whereof I affix my signature, in presence of two witnesses.

PAUL A. FAUST.

Witnesses:
EMIL STAREK,
PHIL. J. NAWN.